United States Patent [19]

Sager

[11] Patent Number: 5,309,822
[45] Date of Patent: May 10, 1994

[54] AUTOMATIC COFFEE MACHINE

[75] Inventor: Peter Sager, Boppelsen, Switzerland

[73] Assignee: HGZ Maschinenbau AG, Dallikon, Switzerland

[21] Appl. No.: 958,954

[22] Filed: Oct. 9, 1992

[30] Foreign Application Priority Data

Oct. 11, 1991 [DE] Fed. Rep. of Germany ....... 4133697

[51] Int. Cl.$^5$ ............................................. A47J 31/043
[52] U.S. Cl. .................................... 99/289 R; 99/297; 99/302 P
[58] Field of Search ................. 99/289 R, 287, 289 D, 99/290, 292, 297, 302 P, 302 R, 286, 300, 293; 426/433

[56] References Cited

U.S. PATENT DOCUMENTS

| | | | |
|---|---|---|---|
| 2,827,845 | 3/1958 | Richeson | 99/289 |
| 3,103,873 | 9/1963 | Breitenstein | 99/289 R |
| 3,760,712 | 9/1973 | Rossi | 99/289 R |
| 4,271,752 | 6/1981 | Valente et al. | 99/289 R |
| 4,308,789 | 1/1982 | Piloni et al. | 99/289 R |
| 4,377,108 | 3/1983 | Rais | 99/290 |
| 4,457,216 | 7/1984 | Dremmel | 99/289 R |
| 4,796,521 | 1/1989 | Grossi | 99/287 |
| 4,797,296 | 1/1989 | Meier et al. | 99/302 P |
| 4,852,472 | 8/1989 | In-albon et al. | 99/302 P |
| 4,885,986 | 12/1989 | Grossi | 99/302 P |
| 5,007,333 | 4/1991 | Sager | 99/286 |

FOREIGN PATENT DOCUMENTS 3843568 12/1989 Fed. Rep. of Germany .
8100107 4/1982 PCT Int'l Appl. .

*Primary Examiner*—Philip R. Coe
*Assistant Examiner*—James F. Hook
*Attorney, Agent, or Firm*—Hopkins & Thomas

[57] ABSTRACT

An automatic coffee machine has a flow heater (1) for preparing hot water, a facility for feeding coffee powder into a percolator, consisting of a percolating chamber (14) formed by a stationary tube section (8) arranged with a vertical axis and two stoppers (12, 13) located at least partly within the flow heater (1), and an axial drive for moving the upper stopper (12) in the direction of the tube section (8) axis, a drive for moving the upper stopper (12) into the parked and stand-by positions relative to said axis, as well as a vertical drive for the lower stopper (13). The upper stopper (12) is mounted on a pivot arm (24) which can be pivoted about a bearing (25) which is fixed in position. The drive for moving the upper stopper (12) into the parked and stand-by positions is an actuator. The upper stopper (12) is constructed in one piece and can be moved in a sealing manner into the tube section (8), by means of the axial drive which is mounted on the pivot arm (24), to achieve the percolating position.

13 Claims, 3 Drawing Sheets

ND COFFEE MACHINE

AUTOMATIC COFFEE MACHINE

FIELD OF THE INVENTION

The invention relates to an automatic coffee machine, in particular for preparing individual cups and jugs of coffee, having a flow heater within a housing for preparing hot water, a facility for feeding coffee powder into a percolator consisting of a percolating chamber formed by a stationary tube section arranged with a vertical axis and two stoppers, at least partly located within the flow heater and in which at least part of the tube section of the percolating chamber is splashed over (surrounded) by the hot water from the flow heater, and having an axial drive for moving the upper stopper in the direction of the axis of the tube section, a drive for moving the upper stopper into the parked and stand-by positions relative to the axis, as well as a vertical drive for the lower stopper.

BACKGROUND OF THE INVENTION

An automatic coffee machine is understood to be a machine in which the processes of grinding the coffee powder, feeding the coffee powder into the percolating chamber, the percolating process itself and the discharge of the used coffee powder as well as the discharge of the used and compressed coffee block of coffee powder is all performed automatically without needing any one of these or any other procedures to be triggered or supported by manual instruction. However, it is understood that for carrying out a cycle, the automatic coffee machine needs to be activated by pressing a button or similar means. The invention may also be used for percolator a large quantity of fresh coffee automatically.

An automatic coffee machine of the above described type is known from U.S. Pat. No. 5,007,333. The upper stopper in the percolator is in this case supported on a slide which in turn can be moved horizontally on a cover section of the flow heater, constructed as a slideway. A linear drive for moving the upper stopper backwards and forwards into the parked and stand-by positions along the axis of the tube section is provided for this. An axial drive for moving the upper stopper in the direction of the axis of the tube section is mounted on the slide and travels with it, whereby these two drives are actuated one after the other. The upper stopper is constructed in two pieces and consists of a carrier part and a partially wedge-shaped centering part which supports a single seal, on the one hand, for closing the percolating chamber, as well as for sealing the inlet of the hot water on the other. The centering part is mounted on the carrier part so that it has limited movement both axially and radially in order to enable self-centering on the upper edge of the tube section, upon which the seal is seated after centering by means of the centering part as a stop and valve seat. At the same time as doing this, the percolating chamber on the one hand, and the hot water inlet on the other, are sealed. The lower stopper, built like a piston and guided within the tube section, also has a vertical drive with a double-action, hydraulically actuated piston. With this known automatic coffee machine the exact positioning of the upper stopper on the axis of the tube section of the percolator is only possible through the two-piece construction of the upper stopper. The linear drive, moving exactly radially with respect to the axis of the tube section, must be built relatively large because the drive elements which engage with the upper stopper, as well as the associated motor, must be mounted on the side of the upper stopper facing away from the tube section in order that, for example, in the parked position, the upper opening of the tube section is not wrongly adjusted so that, for example, the coffee powder may be introduced unhindered into the internal chamber of the tube section. Owing to the large size of the design for the drive and a necessary support it is difficult to transfer the upper stopper into the stand-by position with sufficient accuracy. In addition, differing temperatures, i.e. hot or cold condition, have an expansion/contraction effect on the linear drive. The large amount of space required for this linear drive is a nuisance in many cases, especially in the case of preparing narrow subassemblies for combined machines. The slide also increases the mass to be moved. It must be driven laterally, i.e. outside its center of gravity, meaning a disadvantage, and this troublesome form of construction presupposes that the cover section of the flow heater is designed as a slideway. Further, the hydraulic vertical drive for the lower stopper requires a multiplicity of seals and solenoid valves which can lead to faults. Achieving accurate, reproducible positions for the lower stopper relative to the axis of the percolator and the controllability of these positions is also only possible to a limited degree.

Another automatic coffee machine is known from U.S. Pat. No. 2,827,845. Here too, the percolator has a tube section which is arranged with a vertical axis and partly located already in the flow heater housing so that an essentially constant discharge temperature for the coffee beverage is achieved independently from the chronological sequence of individual percolating cycles. A one-piece upper stopper is used in conjunction with this tube section, whereby said stopper is arranged so that it can move, by means of a single drive, not only radially to the axis of the tube section of the percolating chamber, but also in the direction of the axis of the tube section. The stopper itself is constructed wedge-shaped and provided with a seal which merely fulfils the function of sealing the percolating chamber at the top because the hot water inlet is provided in the area of the lower stopper. The lower stopper is also constructed wedge-shaped and provided with a seal. However, such a percolating chamber with wedge-shaped stoppers has the disadvantage that it is not possible to move these stoppers like a piston within the tube section and, for example, to pre-compress the coffee introduced in loose (powder) form into a block. Compression of the coffee until it is dry and discharge in the dry state are also not possible. By virtue of the wedge-shaped design of the two stoppers, accurate positioning relative to the axis of the tube section is only required to a limited degree.

Another automatic coffee machine is known from WO 82 01 120. The percolating chamber, comprising a stationary tube section with vertical axis, is provided there within a support plate which is connected via a construction comprising guide rods to a second support plate. Hydraulically actuated piston/cylinder units are provided in the second support plate and said units assist in moving into the tube section two piston-type stoppers at each end of the tube section or in moving said stoppers inside said tube section. Consequently, the problem of the accurate axial positioning of the stoppers does not occur here because both stoppers can only be moved axially. In addition, a pivoting funnel piece is provided which serves for introducing the ground coffee powder from the side into the percolating chamber and for discharging the block of used coffee from the percolating chamber.

SUMMARY OF THE INVENTION

The invention, in the case of an automatic coffee machine of the aforementioned type, is concerned with the issue of achieving a more accurate positioning of the upper stopper to the percolating chamber, starting from the parked position, moving to the stand-by position and the subsequent percolating position.

According to the invention, this is achieved in the case of an automatic coffee machine of the aforementioned type in that the upper stopper is mounted on a pivot arm which is in turn mounted so that it may swivel around a bearing fixed in position, that the drive for moving the upper stopper into the parked and stand-by positions is a part-turn valve actuator, and that the upper stopper is constructed in one piece and, to reach the percolating position, the upper stopper can be moved into the percolator tube section in a sealing manner by means of the upper stopper axial drive which is mounted on the pivot arm.

Particularly important is the use of a pivot arm in conjunction with a part-turn valve actuator drive. This pivot arm has a predetermined length which, insofar, cannot be altered so that the positioning of the upper stopper is maintained very accurately with respect to this one coordinate, and that this can be reproduced. The absolute length of the pivot arm, i.e. the distance from its bearing support to the vertical axis of the tube section, is considerably shorter than the support of a linear drive so that thermal influences, and alterations to the length caused by such, only have a minor effect. Moreover, the mounting for the pivot arm bearing can then be disposed in an area of the cover section of the flow heater where temperature differences rarely appear. Advantageously, the surface of the cover section no longer needs to be designed as a slideway because sliding contact is avoided. Perpendicular to an extension of the pivot arm or, with respect to this coordinate the play present in the part-turn valve actuator drive is advantageously exploited, allowing the final centering of the upper stopper in relation to the axis of the percolator tube section. Due to this it is possible that the upper stopper can be advantageously constructed in one piece and thus more simply. Being constructed in one piece means that the upper stopper has several parts joined together and substantially immovable with respect to one another so as to effectively be integrated as a monolithic part. The stopper does not need two parts which move relative to each other, as is the case with the prior art regarding a support part and a centering part. Of course, those skilled in the art will recognize that the one-piece upper stopper can be assembled from several parts; it must, for example, support a seal and also a sieve. The upper stopper can also be moved differently relative to the tube section, than the prior art version. The upper stopper is not seated on to the upper edge of the tube section, on the contrary it is so guided over a longer distance that it can be moved into the tube section in a sealing manner. With this movement over a long contact distance, the play in the part-turn valve actuator drive is utilized for centering purposes.

Another advantage is the simpler construction encumbered with fewer parts. The use of a pivot arm in conjunction with a part-turn valve actuator drive also advantageously leads to the space requirement for this arrangement being reduced so that such a percolating assembly takes up a very narrow space. The seal provided on the upper stopper now only needs to close off the percolating chamber towards the outside even though the upper stopper supports the hot water inlet to the percolating chamber.

It is advantageous if the position-fixed bearing of the pivot arm is disposed on the flow heater housing. It can thereby be guaranteed that heat developed in a controlled manner by the flow heater leads to temperature equalization of the bearing and pivot arm so that these parts exhibit a roughly constant temperature when in operation. Variations in length of the pivot arm due to temperature fluctuations are thereby avoided.

The part-turn valve actuator drive for the pivot arm can have, advantageously, an electric motor with a downstream worm gear pair, whereby the electric motor and the worm are mounted on the pivot arm and the worm gear is locally mounted in a fixed position on a throat of the bearing which is fixed in position. This design permits, on the one hand, reproducibly, accurate angular positioning when swivelling the pivot arm. On the other hand, the downstream worm gear provides sufficient play for the part-turn valve actuator which enables the centering of the upper stopper including the pivot arm in the other direction.

The axial drive for the upper stopper can also have an electric motor with downstream worm gear pair and a nut/spindle unit, whereby the worm gear forming the nut is mounted so that it may swivel on the pivot arm, and the one-piece upper stopper is affixed to the spindle. The spindle is guided in the direction of the axis of the tube section in a manner secured against incorrect turning so that the rotational movement of the nut, or rather the worm gear, is translated into a pure axial movement. This means that considerable gearing reductions can be bridged over so that the end position of the upper stopper attained in the percolating position can be reproduced, and can be achieved very precisely.

The part turn valve actuator drive and upper stopper axial drive electric motors can be mounted on the pivot arm with their axes parallel to each other. The mass of the pivot arm, or rather on the pivot arm, which has to be moved is, on the one hand, thus increased, but on the other hand, the two electric motors can be accommodated in a small space so that they protrude comparatively little and do not increase the structural width of the percolating assembly unnecessarily.

An axial drive for the lower stopper, in the form of an electric motor with downstream worm gear pair and nut/spindle unit, is also provided in conjunction with the special design and drive for the upper stopper. The two drives for the vertical movements of the two stoppers can be constructed not only in a similar manner, but also identically. It is thereby possible to also very precisely position the lower stopper, which supports the drain (outlet) for the coffee beverage, and also accurately monitor the respective positions of the lower stopper. This is especially important for compressing the blocks of coffee powder, and subsequent pressure reduction, controlling various block thicknesses, as is necessary for production of single cups in comparison to production for jugs of coffee, as well as for all other positions of the two stoppers relative to each other up until dry discharge.

DC motors can be advantageously used as electric drive motors, whereby said DC motors additionally improve the precision and accuracy of the positions attained. Such DC motors are also particularly easy to control.

A stay for the purpose of support can be allocated to the pivot arm. This stay is then effective when the pivot arm and the upper stopper are located in the aligned position relative to the percolator tube section axis and have been moved into the tube section, and pressure is being exerted via the lower stopper, i.e. in particular when compressing the blocks of coffee powder or when expelling said block. Even greater forces occur as the water is forced through the blocks of coffee powder when the percolating pressure has built up. In order to avoid the pivot arm deflecting upwards and to cope better with the forces which occur, the pivot arm is supported from above by the stay in these cases.

The part-turn valve actuator drive and the axial drive for the upper stopper are independent from each other, whereby both drives are provided on the pivot arm and can thus be swivelled too. The two drives are obviously activated successively, as the appropriate movement requires. At least one, preferably two strippers are connected with the pivot arm so that the pivoting movement is also used for cleaning coffee powder residue from the surface of the flow heater cover section. The second stripper represents an additional factor of safety in that it sweeps up any coffee powder residue not completely cleaned away by the first stripper.

The tube section forming the percolating chamber can be provided in the lower section of the flow heater housing, whereby the drain for the coffee beverage, in the form of a flexible tube, is connected to the lower stopper. This means that the entire tube section and inasmuch, the entire percolating chamber, is located within the zone which is held at a constant temperature by the flow heater, something that has an advantageous effect on the quality and consistency of the coffee beverage produced. By arranging the hot water inlet in the area of the upper stopper and the drain for the coffee beverage in the area of the lower stopper, clear flow conditions for the water through the block of coffee powder are produced so that the coffee powder is used up or, respectively, utilized in an optimum way.

BRIEF DESCRIPTION OF THE DRAWINGS

In the following, the invention will be further explained and described by means of a preferred embodiment example.

DETAILED DESCRIPTION

Figure 1:
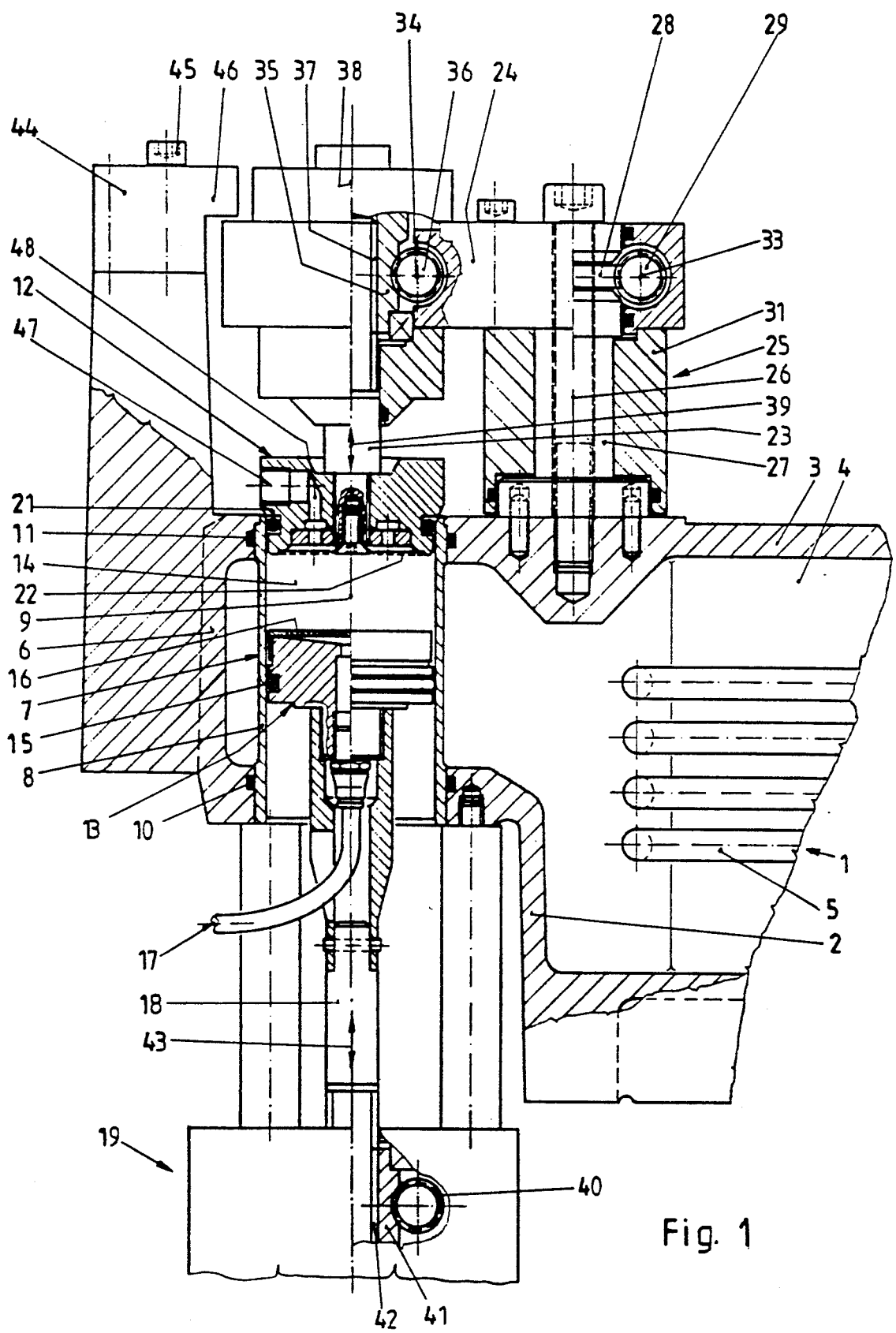
FIG. 1 shows a vertical section through the essential parts of an automatic coffee machine.

The automatic coffee machine has a flow heater 1, the housing of which consists of a lower section 2 and a cover section 3 which are held together by means of a seal and a plurality of fixing screws. The division is not shown here for reasons of clarity. Consequently, an internal chamber 4 is formed in the interior of the housing 2, 3; located in said internal chamber is a heating coil 5, by means of which the water in the internal chamber is heated. The cold water enters via a nozzle, which is not illustrated, provided at the lowest point of the lower section 2.

A percolator 7 is accommodated in a bulge 6 in the housing 2, 3. This percolator 7 has a tube section 8, formed as a cylinder jacket and whose axis 9 is arranged vertically. The tube section 8 is built with comparatively thin walls and disposed, sealed off by means of seals 10 and 11 against the internal chamber 4, in the housing 2, 3 of flow heater 1, whereby the tube section 8 is contained and clamped in between the lower section 2 and the cover section 3. Further essential components of the percolator 7 are an upper stopper 12 and a lower, piston-type stopper 13. The tube section 8 and the two stoppers 12 and 13 enclose a percolating chamber 14 in which the coffee powder, compressed into a block, is passed through by hot water and thereby the coffee beverage is produced. The lower stopper 13 has a seal 15 with which it can be moved inside the tube section 8 in the manner of a piston in a sealed manner. The stopper 13 has a percolator sieve 16 for the coffee beverage, whereby a flexible tube 17, through which the coffee beverage runs in order to be discharged from the automatic coffee machine, is connected beyond the percolator sieve 16. A spindle 18 is connected to the lower piston-type stopper 13. The vertical drive is transmitted to the lower stopper 13 by means of a worm gear pair 19. An electric motor 20 (FIG. 3) is provided for this purpose.

The upper stopper 12 is, in principle, of one-piece construction, has a single seal 21 and carries a sieve 22 on the side facing the percolating chamber 14. The upper stopper 12 is suspended by means of a spindle 23 on a pivot arm 24 which is run on a bearing 25 so that it may swivel back and forth around a vertical axis 26. Specifically, the bearing 25 has a bearing throat 27 in a fixed arrangement on the cover section 3, and said bearing throat is coupled with a worm gear 28 in a manner fixed against rotation and, thereby, fixed in position. Associated with this, a worm 29 is mounted in the pivot arm 24 so that it may rotate, and an electric motor 30 (FIG. 3) is provided for its rotation. The pivot arm 24 is supported, by means of a sleeve 31, so that it may swivel, on the bearing throat 27. It can thus already be understood that by activating the electric motor 30, the worm 29 is moved along the stationary worm gear 28 so that the pivot arm 24 moves back or forth according to the direction of the rotation of the electric motor 30. One end position of this horizontal sweeping movement, in which the upper stopper 12 is located swung away from the tube section 8 of percolator 7 (FIG. 3), is designated the parked position. The other end position, in which the stopper 12 is located above the percolating chamber 14 and seal 11 has not yet been moved into the tube section 8, is designated the stand-by position. If then the upper stopper 12 is moved partly into the percolating chamber 14, as shown in FIG. 1, the percolating position is reached. Another electric motor 32 (FIG. 3) is first provided for this vertical movement of the upper stopper 12 relative to the pivot arm 24; said electric motor, just like electric motor 30, is also mounted on the pivot arm. Axes 33 and 34 of the two electric motors 30 and 32 are arranged parallel to each other here. A worm gear pair consisting of a worm gear 35 and a worm 36 is connected downstream of electric motor 32 as well, whereby worm 36 is merely mounted so that it may rotate on the pivot arm 24 and is driven directly via the output of electric motor 32. The worm gear 35 is mounted on the pivot arm 24 so that it may rotate with the help of the ball bearing indicated, and forms, together with an internal thread 37 which can be designed as a trapezoidal thread, at the same time a nut in which the spindle 23 is suspended with the associated external thread. Spindle 23 is guided in the direction of its axis 38. i.e. prevented from turning incorrectly, so that in this way, the rotational movement of the electric motor 32 is translated into a pure vertical axial movement of the spindle 23 according to double-headed arrow 39. It can be seen from this that in this way, the upper stopper 12 can be moved upwards out of the percolating chamber 14 or downwards into the percolating chamber 14 according to the direction of rotation of the electric motor 32. It is clear that the movement away is completed only when the sieve 22, i.e. the lowest part of the upper stopper 12, lies above the surface of the cover section 3 so that contact with the surface of the cover section 3 in the subsequent swivelling movement into the parked position is avoided.

The vertical drive for the lower stopper 13 is, in principle, identical to the construction of the vertical drive for the upper stopper 12 although this drive is designed for greater strokes. In detail, the worm gear pair 19, in the form of a worm 40 and worm gear 41, is connected downstream of the electric motor 20. The worm gear 41 is again formed as a nut and has an internal thread 42 which works together with an external thread on spindle 18. Spindle 18 is also guided axially so that incorrect rotation is prevented and so that in this way, vertical movements of the lower stopper 13 are possible in accord with double-headed arrow 43 depending on the rotational direction of the electric motor 32.

A stay (support) 44 is assigned to the pivot arm 24, whereby said stay is stationarily affixed to the housing 2, 3 of the flow heater 1, and has a projection 46, the height of which may be adjusted by means of a screw 45 to suit the situation; the pivot arm 24 may move underneath said projection, upon reaching the stand-by position, forming a small separation of a fraction of a millimeter. When moving the upper stopper 12 into the percolating chamber 14 let alone when building up the percolating pressure via the lower stopper 13 the pivot arm 24 can be supported on the projection 46 of the stay 44 so that bending of the pivot arm 24 upwards around the bearing 25 is avoided. This contributes considerably to the longevity of the seal 21 and to exact vertical reguiding and supporting of the upper stopper 12. A nozzle 47 and connecting channel 48 are provided in the upper stopper 12 for introducing hot water into the percolating chamber 14; the hot water is forced via said nozzle and channel, through sieve 22 and let into the percolating chamber 14, or rather the compressed block of coffee powder provided there.

A coffee grinder (mill), which is not illustrated, is provided above axis 9 of the percolator 10 and the discharge nozzles of said grinder can be used to introduce ground coffee powder into the percolating chamber 14 roughly above axis 9 when pivot arm 24 is located with the upper stopper 12 in the swung out parked position. A filling funnel, not illustrated, can also be connected to the pivot arm 24 in order to exert a certain guiding effect on the ground coffee powder which is dropping down. The pivot arm possesses preferably two strippers 49 (FIG. 3) for removing coffee powder from the surface of cover section 3 in this area, as well as for coffee powder residue which stems from the dry discharge of a used block, and said strippers clean the surface of cover section 3 successively during a swivelling movement.

Figure 2:
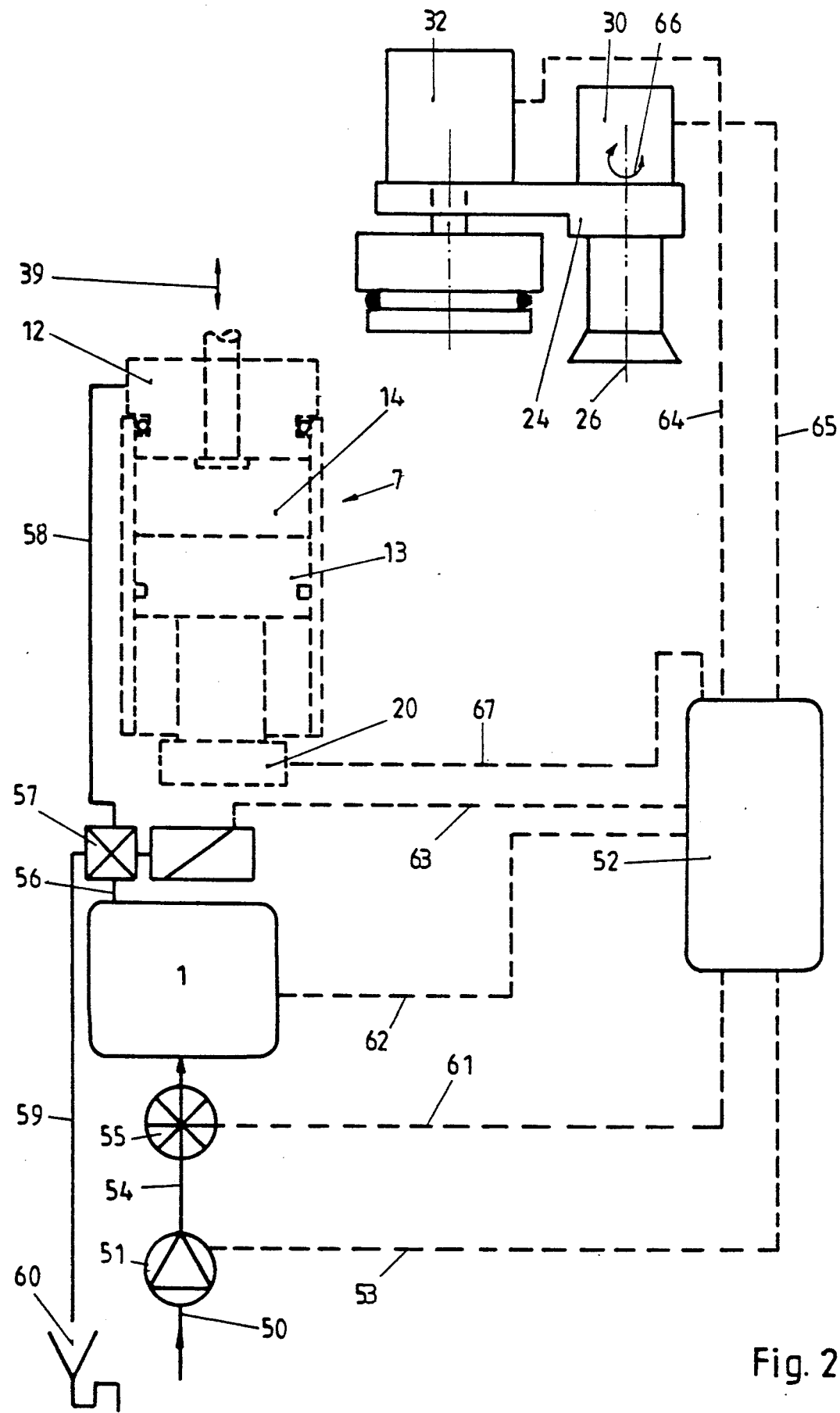
FIG. 2 shows a circuit diagram for the electrics and hydraulics which illustrates the links between the individual parts.

A circuit diagram with the essential parts of the automatic coffee machine is illustrated in FIG. 2, whereby the hydraulic lines are indicated by solid lines and the electric lines by dotted lines. A cold water line 50 leads to a pump 51 which is triggered by an electronic controller 52 via an electric line 53. A water line 54 leads from the pump 51 to a water flow meter 55 and from there to the nozzle of the flow heater 1 located on the lower section 2. A line 56 for hot water leads from the flow heater 1 to a percolator valve 57 and from there as line 58 through the upper stopper 12 into the percolating chamber 14. The percolator valve 57 is designed as a 2-/3-way valve, whereby one line 59 leads to an outlet 60. An electric line 61 leads from the controller 52 to the water flow meter 55, another electric line 62 to the heating coil 5 of the flow heater 1, as well as lines wired in parallel to a temperature control in the flow heater 1 which is not illustrated for reasons of clarity. One electric line 63 controls the percolator valve 57. A further line 64 leads to the upper stopper axial drive 32, 35, 36 according to double-headed arrow 39 for the upper stopper 12, one line 65 to the part-turn valve actuator drive 30, 29, 28 according to double-headed arrow 66 around axis 26. Yet another electric line 67 leads from the controller 52 to the vertical drive 20, 40, 41 for the lower stopper 13.

Figure 3:
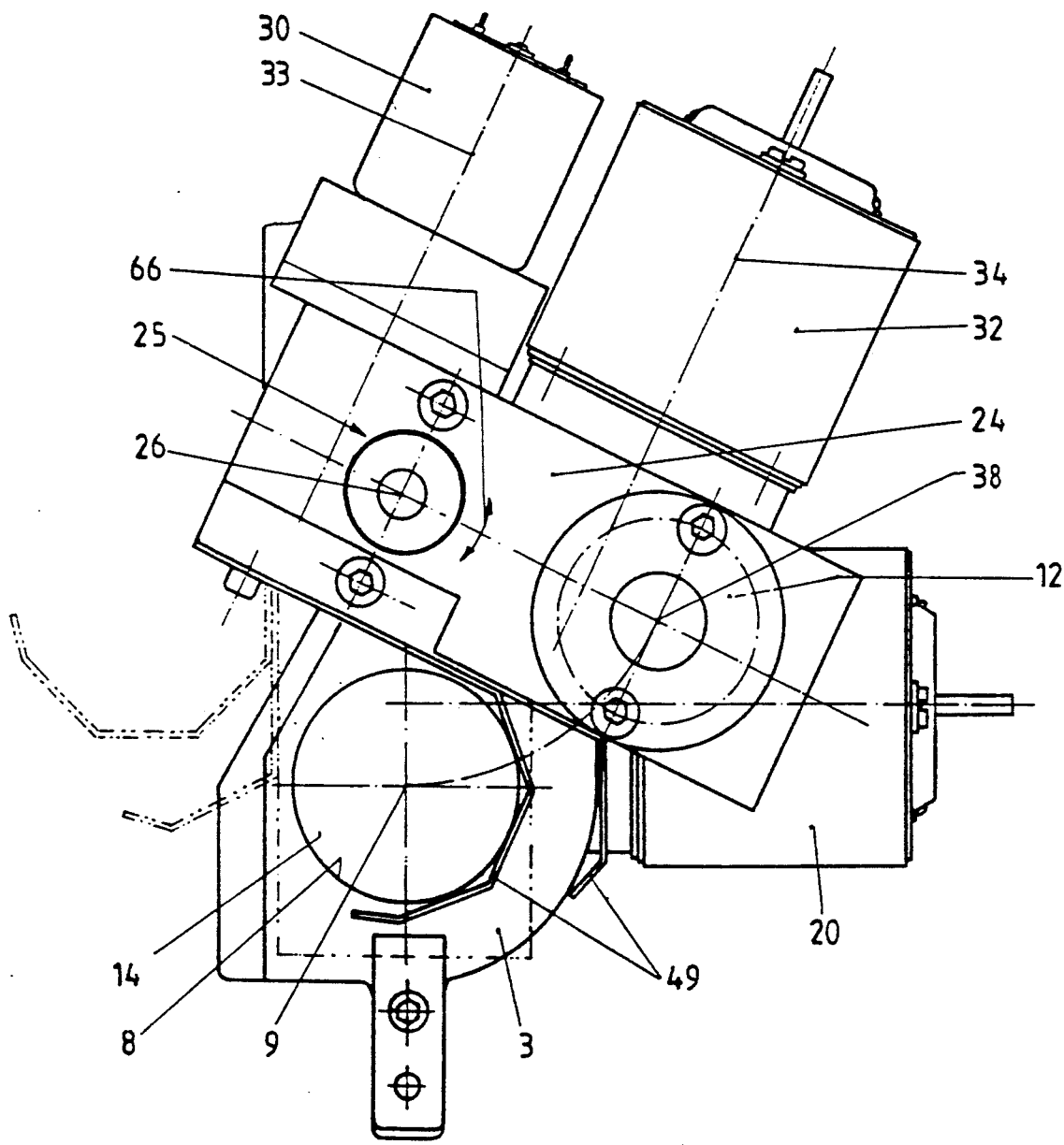
FIG. 3 shows a plan view, from above, of the essential parts of the automatic coffee machine.

FIG. 3 enables one to see the subassembly consisting of pivot arm 24 with upper stopper axial drive 32, 35, 36 and part-turn valve actuator drive 30, 29, 28. The two electric drive motors 30 and 32 are mounted on the pivot arm 24 with their axes 33 and 34 parallel so that they pivot together with said arm. The pivoting is carried out about axis 26 according to double-headed arrow 66 depending on the direction of rotation of electric motor 30. It can also be seen how in doing this, the two strippers 49 traverse across the percolating chamber 14, or, respectively, the adjoining wall of the cover section 3, and clean this area. At the same time, the dry discharge is also realized through this movement, i.e. the used block of coffee powder, raised by the lower stopper 13, can be expelled by means of this movement. The position of electric motor 30 can also be seen from FIG. 3. All three electric drive motors 20, 30, 32 are designed and mounted in relation to each other in such a way that a narrow percolator subassembly is the result.

The function of the automatic coffee machine will be explained by looking at all three figures.

With the daily operation of the automatic coffee machine, for example, at the start of breakfast time the controller 52 is activated. The water for percolating is heated by means of heating coil 5, whereby the percolator 7 with its principal part is also warmed up at the same time. The lower stopper 13 is located, for example, in the position shown in FIG. 1 and is as a result also warmed up, whereby the entire periphery of tube section 8 is rinsed over by water which has been heated. When heating the water the lower part 2 and the cover section 3 are also warmed up so that the upper stopper 12, provided as part of the pivot arm 24, together with bearing 25 is made correspondingly warm. If the temperature control unit in the internal chamber 4 of flow heater 1 indicates that the water has reached the required temperature, then the principal components of the percolator 7 have also reached the appropriate temperature and the automatic coffee machine is then ready. Another switching process, triggered mechanically at the controller 52, allows the first cup or jug of coffee beverage to be prepared. For this, the pivot arm 24 remains with the upper stopper 12 in the parked position or moves via the part-turn valve actuator drive 30, 29, 28 into this parked position so that the percolating chamber 14 can still be accessed from above. The coffee grinder arranged on axis 9 is activated via controller 52 for the appropriate length of time (corresponding to cup or jug) so that an appropriate quantity of coffee powder drops into the percolating chamber 14 of the percolator 7. As soon as the grinding process is complete, the controller 7 activates the part-turn valve actuator drive 30, 29, 28 so that the pivot arm 24 is rotated with the upper stopper 12 according to double-headed arrow 66 until axis 38 lines up with axis 9 of the percolator 7. This pivoting process does not alter the effective length of the pivot arm 24 so that it is possible to maintain this coordinate relatively accurately here. If the pivoting procedure were to be so accurately finished that the other coordinate for the lined-up position of the two axes 38 and 9 is given, then there would be no difficulties in moving the upper stopper 12 into the tube section 8. However, if this coordinate is not reached accurately, then the play present in the part-turn valve actuator drive 30, 29, 28 and the movement produced by this in conjunction with the design of the upper stopper 12 and tube section 8, in particular its upper end, is exploited in order to achieve the precisely aligned position of the two axes 38 and 9. The play present in the part-turn valve actuator drive 30, 29, 28 is, consequently, equally necessary in order to enable this self-centering. Therefore, the upper stopper axial drive 32, 35, 36 is triggered so that the upper stopper 12 moves into the internal diameter of tube section 8 in both cases unit it reaches a point such as that shown in FIG. 1. The seal 21 closes off the top of the percolating chamber 14. The stopper 12 now remains idle for a long time. By triggering the vertical drive 20, 40, 41, the lower stopper 13 is raised so that the loose coffee powder which has dropped in is compressed into a block. During this motion, the pivot arm 24 supports itself under the projection 46 of the stay 44 so that the bearing 25 is correspondingly relieved of load. As soon as the block of coffee powder has been compressed, the electric motor 20 is briefly reversed so that the block is no longer under load. The actual percolating process can begin in this position in that here pump 51 is triggered via line 61 and percolator valve 57 via line 63. Using the water flow meter 54, a quantity of fresh water corresponding to the desired amount of coffee beverage is introduced into the internal chamber 4 of flow heater 1 and a corresponding amount of hot water is delivered via line 58, through upper stopper 12 and through sieve 22 into the percolating chamber 14 where it passes through the block of coffee powder and is discharged via flexible tube 17. The percolator valve 57 is closed again towards the end of the period when hot water passes through the percolating chamber 14, whereby the block of coffee powder is pressed again, or rather pressed dry, by triggering lower stopper axial drive electric motor 20. The discharge of the coffee beverage is then ended. After corresponding unloading of the lower stopper 13, the upper stopper 12 is moved out of tube section 8 by means of part-turn valve actuator drive 30, 29, 28 and swung away into the parked position by means of upper stopper axial drive 32, 35, 36. At the same time or subsequently, the lower stopper 13 is raised by the vertical drive 20, 40, 41 so that the block of used coffee powder is lifted up far enough to enable the upper edge of the lower stopper 13 to line up with the upper edge of the cover section 3. The dry block of coffee powder is then moved laterally on the cover section 3 and this area cleaned by activating part-turn valve actuator drive 30, 29, 28 and with the aid of the stripper 49. Following this, pivot arm 24 swings back into the parked position and the lower stopper 13 can be lowered. A new percolating process can then begin after this.

It should be pointed out that the controller 52 and the various drives as well as the remaining details of the device make it possible to trigger any number of intermediate steps and to perform other measures with the same device. Therefore, it is, for example, conceivable that since the amount of coffee powder for a jug of coffee needs to be more than the amount of coffee powder for a cup of coffee, this can be accomplished by corresponding time control of the coffee grinder and also through appropriate path control of the lower stopper 13 relative to the upper stopper 12. In doing this, a slightly smaller amount of coffee powder can be used than is the case with double the amount of coffee powder for one cup, while retaining consistent quality of coffee beverage.

| Legend for drawings | |
|---|---|
| 1 = Flow heater | 37 = Internal thread |
| 2 = Lower section | 38 = Axis |
| 3 = Cover section | 39 = Double-headed arrow |
| 4 = Internal chamber | 40 = Worm |
| 5 = Heating coil | 41 = Worm gear |
| 6 = Bulge | 42 = Internal thread |
| 7 = Percolator | 43 = Double-headed arrow |
| 8 = Tube section | 44 = Support/stay |
| 9 = Axis | 45 = Screw |
| 10 = Seal | 46 = Projection |
| 11 = Seal | 47 = Nozzle |
| 12 = Upper stopper | 48 = Channel |
| 13 = Lower stopper | 49 = Stripper |
| 14 = Percolating chamber | 50 = Cold water line |
| 15 = Seal | 51 = Pump |
| 16 = Percolator sieve | 52 = Controller |
| 17 = Flexible tube | 53 = Line |
| 18 = Spindle | 54 = Water line |
| 19 = Worm gear pair | 55 = Water flow meter |
| 20 = Electric motor | 56 = Line |
| 21 = Seal | 57 = Percolator valve |
| 22 = Sieve | 58 = Line |
| 23 = Spindle | 59 = Line |
| 24 = Pivot arm | 60 = Outlet |
| 25 = Bearing | 61 = Line |
| 26 = Vertical axis | 62 = Line |
| 27 = Bearing throat | 63 = Line |
| 28 = Worm gear | 64 = Line |
| 29 = Worm | 65 = Line |
| 30 = Electric motor | 66 = Double-headed arrow |
| 31 = Sleeve | 67 = Line |
| 32 = Electric motor | |
| 33 = Axis | |
| 34 = Axis | |
| 35 = Worm gear | |
| 36 = Worm | |

I claim:

1. An automatic coffee machine for the preparation of individual cups and small pots of coffee, comprising:
   a housing;
   a flow heater supported in said housing;
   a percolator, said percolator further comprising:
      a stationary tube section having an upper and a lower end, said tube section forming a percolating chamber around an axis;

an upper stopper, wherein said stopper is sealingly received within the upper end of said tube section; and a lower stopper, wherein said stopper is slidably and sealingly supported within said tube section;

wherein said percolator is at least partially disposed within said housing and at least part of said tube section is surrounded by hot water heated by said flow heater; means for feeding coffee powder into said percolator; a pivot arm, said pivot arm further comprising:

a fixed position bearing mounted upon said housing, said pivot arm being connected to said bearing;

means for rotating the pivot arm about said bearing, whereby said pivot arm is rotated into parked and standby positions with respect to said tube section axis;

upper stopper axial drive means mounted upon said pivot arm for moving said upper stopper toward and away from the upper end of said tube section;

lower stopper vertical drive means for moving said lower stopper along the axis within said tube section;

and wherein said upper stopper is constructed as an integrated assembly and is driven by said upper stopper axial drive means into said tube section for being sealingly received within said tube section.

2. The automatic coffee machine of claim 1, wherein said bearing is mounted upon said housing in spaced relationship to said tube section axis.

3. The automatic coffee machine of claim 2, wherein said bearing further comprises:

an upstanding sleeve defining a hollow core around its longitudinal axis; and wherein said hollow core of said sleeve further comprises a bearing throat disposed within said sleeve.

4. The automatic coffee machine of claim 3 wherein the means for rotating said pivot arm further comprises a part-turn valve actuator.

5. The automatic coffee machine of claim 4, wherein said part turn valve actuator further comprises:

an electric motor;

a first worm gear pair, said worm gear pair comprising a worm and a worm gear, wherein said worm gear is disposed on said bearing throat; and wherein said electric motor drives said worm upon said worm gear.

6. The automatic coffee machine of claim 5, wherein said upper stopper axial drive means further comprises:

an electric motor;

a second worm gear pair, said worm gear pair comprising a worm and a worm gear;

a first spindle having an upper and lower end, wherein said spindle is disposed relative to said tube section axis;

and wherein said upper end of said spindle is fastened to said pivot arm for permitting said spindle to swivel, and said lower end of said spindle is fastened to said upper stopper.

7. The automatic coffee machine of claim 6, wherein the electric motor of said part turn valve actuator drive and the electric motor of said upper stopper axial drive means are each mounted upon said pivot arm, and the longitudinal axes of said electric motors are parallel to each other.

8. The automatic coffee machine of claim 6, wherein said part turn valve actuator drive and said upper stopper axial drive means are each mounted upon said pivot arm, and wherein each of said drives operates independently of the other, and each is carried upon said pivot arm as it rotates.

9. The automatic coffee machine of claim 6, wherein said lower stopper vertical drive means further comprises:

an electric motor;

a third worm gear pair, said worm gear pair comprising a worm and a worm gear;

a second spindle having an upper and lower end, said spindle being disposed along said tube section axis, and wherein said upper end is fastened to said lower stopper, and said lower end is driven by said worm;

wherein said electric motor drives said worm upon said worm gear;

and wherein said worm gear forms a nut disposed upon said spindle.

10. The automatic coffee machine of claim 9, wherein the electric motor of said upper stopper axial drive, the electric motor of said lower stopper vertical drive, and the electric motor of said part turn valve actuator are each a D.C. electric motor.

11. The automatic coffee machine of claim 1, further comprising a stay mounted upon said housing adjacent said pivot arm for minimizing any upward bending of said pivot arm when said upper stopper is driven into the upper end of said tube section.

12. The automatic coffee machine of claim 1, wherein said tube section is supported within said housing.

13. The automatic coffee machine of claim 1, further comprising flexible tube means connected to said lower stopper for draining freshly brewed coffee from said percolator.

* * * * *